J. P. Pirsson,
Steam-Boiler Condenser.
No. 584.
Reissued Aug. 10, 1858.
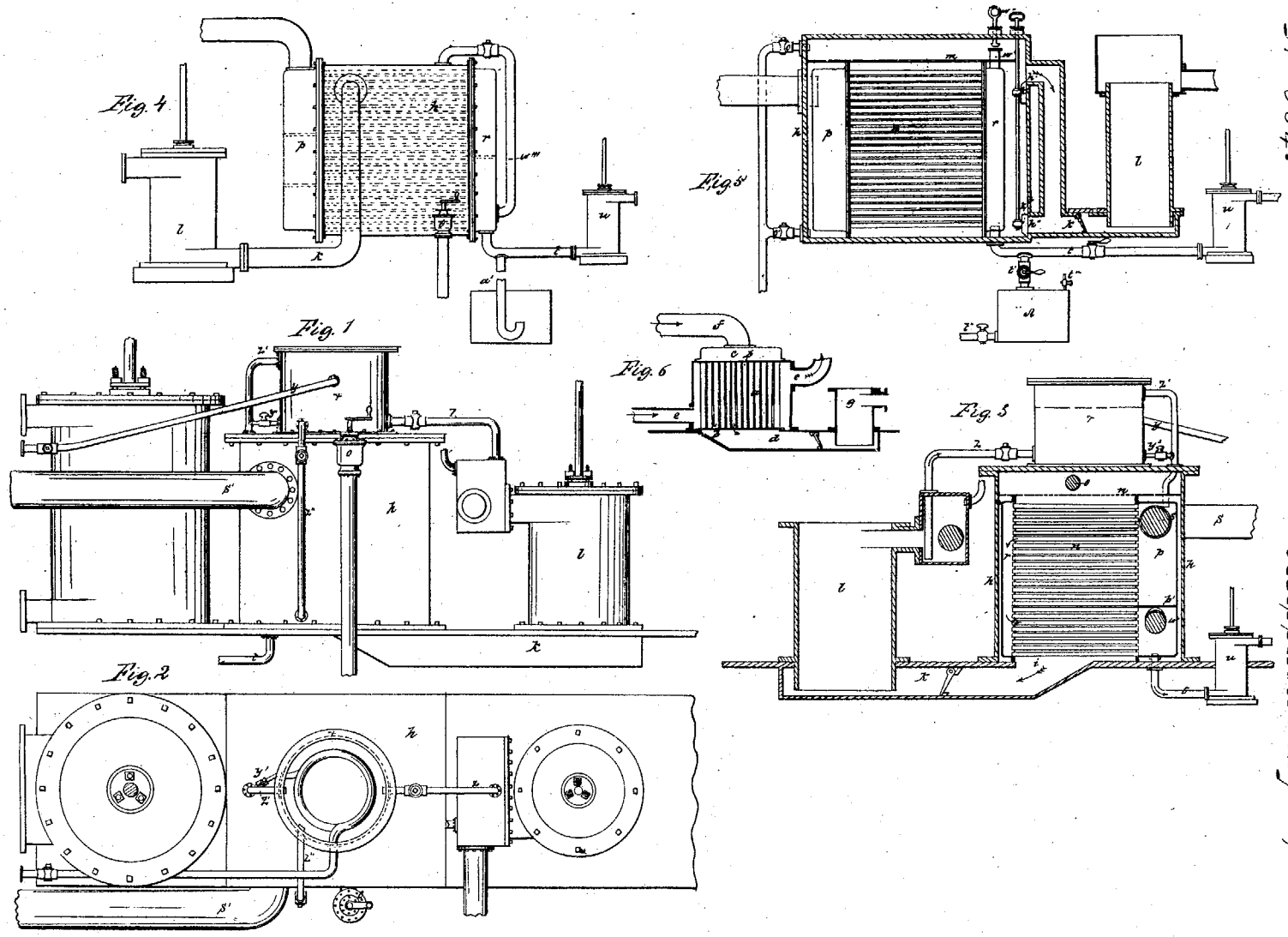

UNITED STATES PATENT OFFICE.

JOSEPH P. PIRSSON, OF NEW YORK, N. Y.

IMPROVEMENT IN SURFACE-CONDENSERS FOR STEAM-ENGINES.

Specification forming part of Letters Patent No. 7,250, dated April 2, 1850; Reissue No. 584, dated August 10, 1858.

*To all whom it may concern:*

Be it known that I, JOSEPH P. PIRSSON, of the city, county, and State of New York, have invented a new and useful Apparatus for Condensing the Steam in Steam-Engines; and I do hereby declare that the following is a full, clear, and exact description of the same, reference being had to the annexed drawings, making a part of this specification, in which—

Figure I is a side elevation. Fig. II is a top view. Fig. III is a longitudinal vertical section. Figs. IV and V are views showing variations in the construction of the same apparatus. Fig. VI is a view of a surface-condenser of common construction; and similar letters refer to similar parts throughout unless specially noted to the contrary.

My invention comprises certain improvements in that class of condensers which has for its object the preservation of the water resulting from the condensation of the steam after it has passed through the cylinder, and which water, being freed from saline or other foreign matters, may be preserved to be again fed into the boilers of marine engines instead of feeding the same wholly with salt-water; and in order to show with clearness the peculiarities which distinguish my said invention from the surface-condenser as heretofore known and used, I will first describe one of those which may be taken as a type of the class, since it embodies the general principles upon which all of them operate.

Fig. VI exhibits the usual mode of construction. At *a* is a cluster of pipes (that being generally the best form to resist pressure) inserted in two flanges, *b*. The ends of these pipes are covered at *c* by a cap, and at *d* by the channel in the bed-plate. At *e* is a tank to hold the water for condensing, which flows in and out as indicated, being usually driven through by a force-pump. At *f* is the exhaust-pipe for conveying the steam to be condensed, and *g* is the air-pump. The steam is thus condensed by coming into contact with the cold surface of the metal, the pump *g* maintaining the vacuity of the pipes by removing the water as fast as it accumulates in the channel *d*, and also any air or uncondensed gases; hence the external surfaces of the tubes are subjected to the pressure of the atmosphere, and also to that of the column of water in which they are immersed, as before named.

This mode of condensing steam has these difficulties to contend with, and which have hitherto been found insuperable, viz: The heating and cooling of the metal pipes consequent upon the periodic injections of the steam and of the action of the cold water cause a continual alternation of expansions and contractions, and these, together with the great pressure upon them, soon produce fractures in the various joints and seams. When such occur, the vacuum can no longer be maintained because of the flowing in of the air, and also of the water, which of course is fatal to the whole operation. In addition to these defects, this system has another, resulting from the fact that, as the wear of tubes so situated must be necessarily rapid, the time must sooner or later arrive when, in consequence merely of such wear, the condensing-surfaces must give out. The moment at which this will occur cannot be foreseen; but it will almost certainly take place at a time when the continued working of the engine is particularly needed—as, for instance, during a storm, since then the forces are most energetically in operation which tend to its destruction.

Previous to the date of my invention, although many plans had been devised for prolonging the wear or lessening the liability of the condensing-surfaces to fracture, still none had been brought forward which claimed to be able to continue the condensation and maintain the vacuum when such fracture did occur. The ability to do this is the principal characteristic of my invention, while in carrying that out it will be evident that some of the forces which in the old condensers were most effective in causing fractures do not in mine exist at all, while others are exerted harmlessly.

The nature of my invention may be stated, therefore, as consisting, first, in inclosing the surface-condenser within a tank or vessel which shall be so constructed as to be capable of serving as an ordinary jet-condenser when any derangement of the tubes or other condensing-surface of the surface-condenser proper shall require it, thereby affording an alternative which shall secure the continuity of the vacuum, though of course at the expense of a loss of the whole or a part of the fresh water afforded by the surface condenser when that is in perfect working order.

A second and highly-important feature results from the above-named construction—viz., the ability to maintain a vacuum more or less perfect, but nevertheless equal, on both the outside and the inside of the surface-condenser at the same time, and thus to relieve said surface-condenser from atmospheric pressure. The danger from fractures caused by this pressure, as well as the impairing the vacuum caused by small leaks, is thus obviated, while, as it is only required to secure the tubes against movement at one of their ends, the other ends thereof may be left free to move, and hence the disruption usually attendant upon the alternate expansions and contractions does not in mine occur at all.

The following exhibits a method of construction which it will be seen bears out fully the above allegations.

At the letter *h* is represented a box or case composed of metal and of sufficient strength to resist the pressure of the atmosphere, and it is also to be made air and water tight as far as possible. In the under side of this there is an opening, *i*, Fig. III, through which a connection is made by a channel, *k*, with an air-pump, *l*, of a common construction. At *m* is a perforated plate, on which the water for effecting condensation is received, being for the purpose of dispersing that water, in a manner well known; and at *o* is a pipe and cock for injecting said water. Into the box thus constructed, which will be recognized as an ordinary "jet-condenser," I next introduce a "surface-condenser"—that is to say, an apparatus by which steam is to be condensed by contact with cold metallic or like surfaces, and which I make as follows: At *n*, Fig. III, is shown a number of pipes or tubes arranged horizontally, their ends being fixed into plates or flanges of metal having holes perforated to receive them. I cover the ends of said tubes by attaching caps *p* and *r* to these plates, as shown in section, Fig. III. The tubes thus arranged are introduced within the box *h*, as shown. In the cap *p* there is an opening made at *s* to receive the end of the pipe which conveys the steam to be condensed, and which pipe is seen at *s'*. This steam-pipe is bolted tightly to the outside of the box *h* by a flange, and its end, extending into the box, enters the cap *p* at *s*, as shown. The cap *p* is divided into compartments by a partition, *p'*, the object of which is to cause the steam to traverse through two sections of tubes. More partitions may be introduced to insure full and equal distribution of the steam to each tube. At *t* is shown a pipe connected with the lower side of the cap *p* and passing through the box *h*, having a tight joint where it comes out. This pipe terminates in a pump, *u*, the use of which is to pump away the water resulting from the condensation of the steam, and which collects in the bottoms of the tubes and in the caps. At *w* is an opening in the lower division of the cap *p*, which forms a passage from the tubes to the interior of the box, the use of which will be described more fully. This opening *w* is to have a door or valve over it of common construction, which may be opened or closed by a handle from the outside of the box or case *h*, or may be made to operate of itself, the handle working through a stuffing-box in *h*.

I have described this part of my invention as being made of tubes or pipes chiefly; but it is obvious that other forms may be substituted, as sheets of metal, coils of pipe, &c., and the operation of it is as follows: The engine being started in the usual manner, the exhaust-steam flows through the pipe *s'* into the cap *p*, and thence into the cluster of tubes *n*. At the same time a jet of cold water is admitted through the injection-cock *o* onto the perforated plate *m*, from which it falls in a shower upon the tubes *n*, and thus, by a well-known law, at once condenses the steam, the water resulting being collected in the bottom of the tubes and caps. The large pump *l* removes the condensing water as fast as it accumulates from the box *h*, and also maintains a vacuum therein. The smaller pump, *u*, removes the water resulting from the condensed steam in like manner, at the same time maintaining a vacuum within the tubes. The condensing water is allowed to flow off as fast as discharged from the pump *l*; but the water taken from the tubes is discharged into a suitable reservoir to be used as feed to the boilers. The aperture *w* is for the purpose of insuring the maintenance of an equal pressure on each side of the tubes, or, rather, to prevent them from being subjected to any pressure, either internal or external. This can be made apparent as follows: Supposing the orifice *w* closed and cold water admitted in quantity sufficient to condense a part of the steam only, it will be evident that the vacuum within the case *h* will be better than that in the tubes, and the difference will be as the volume of uncondensed steam. Now, if we open the door or valve over the aperture *w*, a portion of the steam in the tubes will at once rush through and extend itself throughout the case *h* until an equilibrium is produced. So long as the steam is fully condensed and the operation of the pumps *l* and *u* is also equal, so long, of course, the surface-condenser *n* will be subjected to the same pressure both externally and internally, or, rather, will not be subjected to any, even if the orifice *w* be kept closed. The use of the opening *w*, therefore, is to insure the preservation of the equilibrium in cases where the steam is not fully condensed or where the pumps fail to work equally, the atmospheric pressure being in all cases sustained by the case *h*, whether the vacuum is maintained within the tubes or not. The peculiar feature of an alternative will now be seen, for so long as the various joints of the surface-condenser remain tight, and it is otherwise in good order, the operation will go on as in the old kinds of condensers. Should a fracture occur from any cause, as by some of the tubes wearing out, the box or case will at once come into play as a jet-condenser to condense so much of the steam as shall escape through the defective tube or tubes, and the occurrence of such a defect would still further serve to illustrate the advantage of my said improvement; for whereas in the old surface condenser a comparatively small leak would at once destroy its operation, in mine that only involves the loss of so much of the fresh water as can escape in the form of steam through the defective aperture.

By the foregoing description it is seen that the condensing water is applied to the surface-condenser in the usual manner of a jet condenser—viz., as spray or a shower. I consider this the preferable mode to apply the same, as thus the feature of an alternative becomes self-operating, being always ready to come into play as occasion shall require. Other variations in the construction may be made, whereby the jet must be especially applied, as in the case of filling the tank and immersing the tubes, or when the cold water is passed through the tubes. In the last-named case the steam will be exhausted directly into the box *h*, and the jet will only be applied in case of accident. Several of these modifications will be hereinafter described.

In all systems of surface condensation the waste by leakage must be supplied in some way. This is commonly done by the evaporation or distilling of the salt-water, and such apparatus I have combined with my condenser.

At *x*, Figs. I, II, and III, is seen a tank, standing upon the top of the condensing-case *h*, though it may be put in any other convenient place. This tank must be air and water tight, and also capable of sustaining the pressure of the atmosphere. At *y* a steam-pipe is attached, which may terminate on the inside in a coil or cluster of pipes, or other chamber for holding steam, as shown. The lower end of this coil terminates in a pipe, which passes out through the side of the tank at *y'*, and empties into another pipe, as shown. At *z* is a pipe attached to the lower side of the tank *x*, the opposite end terminating in the "hot-well" of the air-pump *l*, or other reservoir containing a supply of the water to be evaporated. *z'* is a pipe attached to the upper side of the tank *x*, and is bent so as to pass down through the top of the case *h*, to which it is bolted by a flange, the end terminating so as to discharge into the cap *p* of the inside condenser, as shown. *z''* is a pipe attached to the tank *x* near its bottom by one end and by the other to the case *h*, so as to discharge into it.

To put this apparatus in operation, the engine is first set in motion, and, the condensation of the steam going on, the vacuum of the case *h* will be communicated through *z'* to the tank *x*, the interior of which will consequently be *in vacuo*. The cock in the pipe *z* being opened, water from the hot-well of the pump *l* will flow into *x* by the pressure of the atmosphere. The tank is to be filled sufficiently to cover the coil of pipes, or, as seen at the dotted lines, steam is then to be admitted through *y*, the cock *i* being kept closed, except when it is necessary to draw off the water which may collect from the condensation of steam in this place. By this means the water in *x* will be vaporized, the vapor being drawn off as fast as it rises through the pipe *z'* into the cap *p* of the condenser, and it is there condensed along with the exhaust steam from the engine, so that it serves to make up for the loss by leakage, &c., of the first supply.

As this apparatus is of use only where the water for generating the steam is impure or salt, some mode is required for keeping the tank *x* clear of the deposit of these impurities, as by evaporation all such must collect in the evaporating vessel according to laws well known. I remedy this case by means of the pipe *z''*, which pipe, entering the evaporator near its bottom and discharging into the case, as shown, is in effect a "blow-off." The saturated water will flow through it into the case, and be pumped out with the condensing water by the air-pump *l*.

In Fig. V is a view of a modification of the condensing apparatus, exhibiting a variety of modes of operating my said invention. In this the surface-condenser is to be immersed in water, the condensing water flowing in through a hole near the bottom of case *h*, and out by an opening at or near the top of the said case. As the operation goes on, the cold water flows in through the open cock *o'*, and, filling the tank or case, immerses the tubes and flows off by the passage *h'*, the pump *l* operating to keep a constant flow of cold water passing through. In this plan the tubes will be subjected to the pressure of the water according to its depth, and also to that of the atmosphere in case the equilibrium opening *w'* be closed by its valve *w''*, and the water be allowed to come into the case *h* as fast as the pump *l* can pump it out; but if the cock *o'* be partially closed a vacuum will be formed in the space above the opening *h'*, and the atmospheric pressure reduced thereby, according as said vacuum is more or less perfect. As the water cannot enter under these circumstances as fast as the pump *l* is able to draw it off, it will not rise above *h'*; consequently the valve *w''* may be raised from the equilibrium-aperture *w'*, if required, since the water used for condensing cannot then flow in and mix with the pure water of the condensed steam.

In case the tubes give out or spring a leak, the alternative feature of the jet-condenser must then be resorted to, and the water applied upon the shower-plate or "strainer" *m*. In that case the cock *o'* must be closed and valve *k''* must be opened, the water for condensation being then let in through *o* onto the showering plate *m*, in the manner before described. The aperture for insuring the equilibrium is in this plan placed in such situation that the condensing water cannot enter the tubes when those are immersed. It is shown at the pipe *w'*, Fig. V, and *w''* is the stop or valve for opening or closing it.

The next feature is a method of dispensing with the pump *u*. At A is a tank, air and water tight, and capable of sustaining the pressure of the atmosphere. This is to be connected to *t* by a pipe with a valve or cock intermediate, as *t'*. At *t''* is a delivery-cock, and at *o''* an air-cock. The pump *u* being disconnected, *t'* is to be opened, and thus communication is made between the tank A and the interior of the tubes *n*, as plainly shown, *t''* and *t'''* being closed always when *t'* is opened. The water from the condensed steam will now descend by its gravity into the tank A, and when that is full *t'* must be closed, *t''* and *t'''* opened, which permits the water in A to run out, being collected in reservoirs from which the boilers are to be fed. As soon as A is empty, close *t* and *t'''* and open *t'* until again filled, and so on. The periodic opening and closing of these valves or cocks can be easily arranged to be operated by the works themselves.

Fig. IV exhibits another arrangement, embodying, however, the same general principles. The principal variation in the construction of this part of my invention consists in forming the case *h* so that the tubes *n* shall be inserted in the two opposite sides, as shown in the dotted lines. In that case the caps *p* and *r*, to cover them, are placed outside. The injection-cock *o* is placed at the bottom and the delivery-pipe *k* at the top, so that the pipes are shown as immersed in the water, but may be showered by making the changes before described. At *w''* is represented a pipe forming a communication with the box *h* and the interior of the pipes *n* for keeping the pressure equal, and is equivalent to the aperture *w* in Fig. III, or *w'* in Fig. V. Another variation consists in the manner of removing the water of the condensed steam, the same principles being applicable to removing the condensing water also. The pump *u* being taken off, a pipe, *a'*, is substituted, which is attached to the cap *r*, where the water from the condensed steam accumulates. This pipe must have a descent vertically to a sufficient distance to cause the column of water to counterbalance the atmospheric pressure—say of thirty-four feet—and may terminate in a reservoir. By this means the gravity of the water will overcome the vacuum in the pipes, and thus deliver itself without other mechanical aid.

I claim as of my invention and desire to secure by Letters Patent of the United States—

1. So inclosing the condensing-surfaces of a surface-condenser within a tank, which is constructed to be capable of acting as a jet-condenser, that when the said surface-condenser shall become deranged by leaks or otherwise resort may be had to the jet-condenser, whereby condensation may be continued and the vacuum maintained, substantially as set forth.

2. The combination of a surface-condenser with a box or case in such manner that the condensation of the steam shall be effected therein without subjecting the said surface-condenser to atmospheric pressure, substantially in the manner described.

3. The aperture *w*, or its equivalent, for maintaining the vacuum and as a passage for any steam which may remain uncondensed in the radiating condenser, as set forth.

4. Connecting the evaporator with the chamber *h*, substantially in the manner described, whereby the saturated water can be drawn off from the bottom of the evaporator.

In witness whereof I have hereunto subscribed my name.

JOSEPH P. PIRSSON.

Witnesses:

S. H. MAYNARD,
C. CLARKSON, JR.